No. 647,484. Patented Apr. 17, 1900.
S. G. DORR.
RUBBER TIRE FOR VEHICLES.
(Application filed Jan. 29, 1900.)

(No Model.)

Witnesses.

Inventor:
Samuel G. Dorr,
By James L. Norris.
Atty.

UNITED STATES PATENT OFFICE.

SAMUEL G. DORR, OF BUFFALO, NEW YORK.

RUBBER TIRE FOR VEHICLES.

SPECIFICATION forming part of Letters Patent No. 647,484, dated April 17, 1900.

Application filed January 29, 1900. Serial No. 3,181. (No model.)

*To all whom it may concern:*

Be it known that I, SAMUEL G. DORR, a citizen of the United States, residing at Buffalo, in the county of Erie and State of New York, have invented new and useful Improvements in Rubber Tires for Vehicles, of which the following is a specification.

My invention relates to rubber tires for vehicles, and has for its object to provide a tire which will enable the wheel to follow the ordinary tramway rails or tracks and which will greatly facilitate the readiness with which the wheel will mount the rail when the former is leaving the track or when the rail is approached obliquely by the vehicle.

To this end the invention resides in the features of construction and combination of parts hereinafter described, and particularly pointed out in the claims.

I have illustrated the invention in the accompanying drawings, in which—

Figure 1:
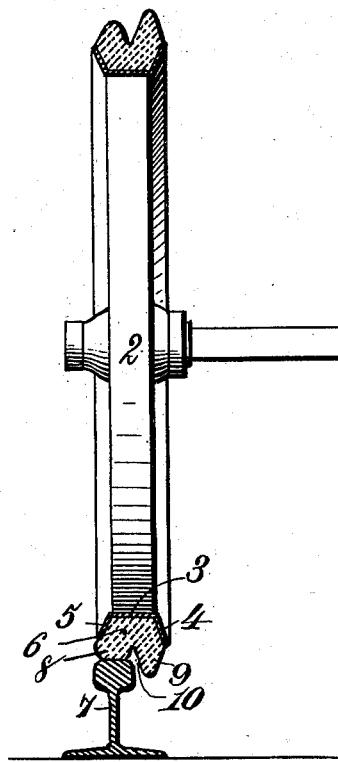
Figure 1:
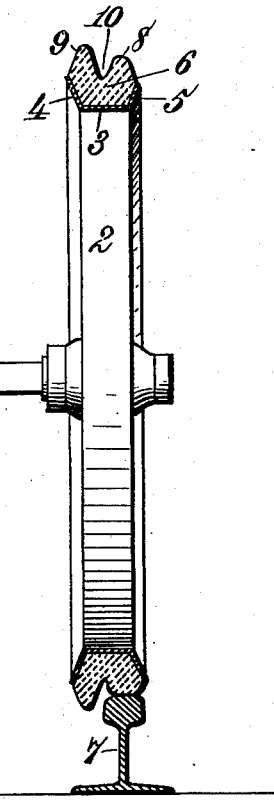
Figure 2:
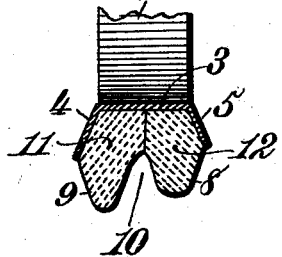

Figure 1 is a section through two wheels and an axle of a vehicle, the wheels resting upon the rails of a track; and Fig. 2 is a section through a rim provided with a modified form of tire.

Referring to the drawings, the numeral 1 indicates an axle, and 2 the wheels, of an ordinary vehicle, while the numeral 3 indicates flanged metal rims secured on said wheels, the inner flange 4 whereof is wider or of a greater circumference than the outer flange 5, in order to better support the flange of the tire, as will be explained later on. The rims are otherwise of such construction as will permit them each to have secured therein a rubber tire 6, formed as an integral structure or in two annular parts, as shown in Fig. 2.

The numeral 7 indicates the rails of a tramway.

In the preferred construction the tire which I have devised is provided with two integral annular peripheral projections 8 9. The projection 8 on the outer side of the wheel is relatively thick and smaller in diameter than the projection 9, as shown, and is intended to form the main support for the weight of the vehicle, and will therefore be termed the "tread," while the projection 9 is of less thickness, but larger diameter, than projection 8 and is suitably formed to act as a flange for the wheel when running on a rail. This projection I will term the "flange." Said tread and flange are separated by an annular V-shaped groove 10.

In the practical application of the invention I design that the wheels of the vehicle upon which the tires are placed shall be at such a distance apart that when running on the rails of a track the outer projections or treads 8 will ride upon the rail, and consequently be continuously depressed, while the inner projection or flanges 9 will extend below the rail, by reason of the compression of said tread and the greater diameter of the flange, and will bear against the inner side thereof to prevent the wheel leaving the track, being supported laterally by the wide flange 4. The V-shaped groove is of importance as tending to prevent the tread and flange being pressed together, for should this occur the wheel would readily leave the track. At the same time the wheels may be readily turned out of the track by reason of the fact that the tread 8 is already on the upper surface thereof, and but slight force will be required to cause the flange 9 to mount the rail. In crossing a track or rail the give of the tire resulting from the provision of the groove 10 will enable the tire to more readily "bite" the rails and mount the same.

In the modified form of the invention the tire is constructed in two annular portions 11 12, secured in the rim 3 in any suitable manner, the part 12 being shown provided with an integral tread 8 and the part 11 with an integral flange 9, having a larger diameter than the tread 8, as before, and said parts being so formed as when placed together to provide the V-shaped groove 10, separating the tread and flange.

In the modified form it is contemplated that when the flange is worn down it may be slipped into the position of a discarded tread without removal from the wheel and a new flange supplied in its place.

Having thus fully described my invention, what I claim as new is—

1. A rubber tire for vehicles having its tread-surface provided with two annular projections, one of which is thicker than the other, whereby to adapt the tire for ordinary use and for use on a tramway, substantially as described.

2. A rubber tire for vehicles having its tread-surface provided with two annular projections, one of which is of greater diameter than the other, whereby to adapt the tire for ordinary use and for use on a tramway, substantially as described.

3. A rubber tire for vehicles having its tread-surface provided with two integral annular projections, one of which is of greater diameter than the other, whereby to adapt the tire for ordinary use and for use on a tramway, substantially as described.

4. A rubber tire for vehicles having its tread-surface provided with two annular projections separated by a V-shaped groove, whereby to adapt the tire for ordinary use and for use on a tramway, substantially as described.

5. A rubber tire for vehicles having its tread-surface provided with two annular projections one of which is of greater diameter than the other, said projections being separated by a V-shaped groove, whereby to adapt the tire for ordinary use and for use on a tramway, substantially as described.

6. A rubber tire for vehicles constructed in two annular parts, one of which is provided with a tread and the other with a flange, substantially as described.

7. A rubber tire for vehicles constructed in two annular parts, one of which is provided with a tread and the other with a flange, said parts being so constructed as when placed together to provide an annular V-shaped groove separating said flange and tread, substantially as described.

8. A rubber tire for vehicles constructed in two annular parts forming a tread and a flange, respectively, said parts being interchangeable in position on the rim, substantially as described and for the purpose set forth.

I testimony whereof I have hereunto set my hand in presence of two subscribing witnesses.

SAMUEL G. DORR.

Witnesses:
  CHAS. H. RUDOLF,
  JNO. F. HOWLETT.